United States Patent

Flake et al.

(10) Patent No.: US 7,596,721 B1
(45) Date of Patent: Sep. 29, 2009

(54) METHODS AND STRUCTURE FOR PATCHING EMBEDDED FIRMWARE

(75) Inventors: Lance Flake, Longmont, CO (US); Andrew W. Vogan, Longmont, CO (US)

(73) Assignee: Maxtor Corporation, Scotts Valley, CA (US)

( * ) Notice: Subject to any disclaimer, the term of this patent is extended or adjusted under 35 U.S.C. 154(b) by 1200 days.

(21) Appl. No.: 10/755,117

(22) Filed: Jan. 9, 2004

(51) Int. Cl.
*G06F 11/00* (2006.01)
(52) U.S. Cl. ........................................ 714/42
(58) Field of Classification Search .............. 714/5, 714/42
See application file for complete search history.

(56) References Cited

U.S. PATENT DOCUMENTS

| | | | | |
|---|---|---|---|---|
| 5,051,897 A * | 9/1991 | Yamaguchi et al. | ......... | 711/103 |
| 5,454,100 A * | 9/1995 | Sagane | .......... | 714/8 |
| 5,757,689 A | 5/1998 | Seno | | |
| 5,813,043 A * | 9/1998 | Iles et al. | ...... | 711/163 |
| 5,983,000 A * | 11/1999 | Perron | ........ | 714/8 |
| 6,049,672 A * | 4/2000 | Shiell et al. | ........ | 717/168 |
| 6,073,252 A * | 6/2000 | Moyer et al. | ....... | 714/7 |
| 6,076,134 A * | 6/2000 | Nagae | ........... | 711/1 |
| 6,128,751 A * | 10/2000 | Yamamoto et al. | .......... | 714/8 |
| 6,158,018 A | 12/2000 | Bernasconi et al. | | |
| 6,260,157 B1 | 7/2001 | Schurecht et al. | | |
| 6,412,081 B1 * | 6/2002 | Koscal et al. | .......... | 714/34 |
| 6,438,664 B1 * | 8/2002 | McGrath et al. | ........... | 711/154 |
| 6,463,549 B1 * | 10/2002 | Shperber et al. | ........ | 714/7 |
| 6,530,005 B2 * | 3/2003 | Koschella et al. | .......... | 711/165 |
| 6,891,765 B2 * | 5/2005 | Saado | ........... | 365/200 |
| 6,931,477 B2 * | 8/2005 | Oakley et al. | ......... | 711/2 |
| 7,039,776 B2 * | 5/2006 | Wong et al. | .......... | 711/159 |
| 7,051,231 B2 * | 5/2006 | Chi | ............... | 714/8 |

* cited by examiner

*Primary Examiner*—Michael C Maskulinski
*Assistant Examiner*—Amine Riad
(74) *Attorney, Agent, or Firm*—David K. Lucente

(57) ABSTRACT

Methods and structures for providing patches or updates to embedded ROM firmware simply and inexpensively while avoiding imposition of execution or memory fetch overhead. A patch memory includes locations storing addresses and optional alternate data values. Read/fetch operations addressed to a firmware ROM memory are applied in parallel to the patch memory. All locations of the patch memory may be compared in parallel to the supplied address to determine if a match is found in patch memory. If no match is found, the read/fetch memory cycle completes normally retrieving data from the ROM memory. If a match is found, the alternate data value is applied to the data bus in place of the ROM memory data retrieved. Any ROM location may therefore be patched regardless of whether the location stores instruction or data.

4 Claims, 2 Drawing Sheets

METHODS AND STRUCTURE FOR PATCHING EMBEDDED FIRMWARE

BACKGROUND OF THE INVENTION

1. Field of the Invention

The present invention relates generally to embedded system memory and in particular relates to methods and structures for patching information (program instructions and/or data) stored in an embedded memory subsystem.

2. Related Patents

This patent is related to U.S. provisional patent application Ser. No. 60/425,470 which is hereby incorporated by reference.

3. Discussion of Related Art

Embedded computing systems are often utilized for control of various devices. The simplest of consumer electronic devices such as microwave ovens, telephones, televisions etc. often include embedded microcontrollers that provide certain forms of device control and user interfacing for the device. In commercial applications, embedded computing systems often control various forms of devices such as computing and communication devices as well as numerous other types of machines and tools generally applicable to the commercial realm.

Such embedded computer systems typically include a general or special purpose processing unit that executes programmed instructions. The program instructions are typically stored in some form of read only memory that provides a nonvolatile store for program instructions, data and configuration information. The embedded processor may fetch program instructions and read data directly from the read only memory device ("ROM"). Program instructions encoded and stored in such a ROM device are often referred to as "firmware."

Sometimes it is necessary to provide corrections or updates to the firmware within such an embedded computing system or controller. For example, communication devices may require updating from time to time in response to protocol changes, feature enhancements, bug fixes, etc. In a manufacturing environment for devices having embedded firmware, such updates may be performed by removing an earlier ROM device and substituting a replacement ROM device with corrected firmware. In some cases, ROM memory device replacement may be performed in a field environment (i.e., at a site remote from a manufacturing context). Typically, such field replacements require a skilled engineer or technician and significant care in the procedures to replace the ROM memory component. To better address the need of field firmware updates (i.e., in situ firmware updates), various techniques and structures have been employed to enable "patching" of the firmware. However, prior update or "patching" techniques generally presented numerous rigid limitations and constraints including, in some cases, imposed a performance penalty.

Some prior patching techniques required particular program coding styles and standards in the firmware to be patched. These coding styles permit simpler patching of the program constructs. In general, such techniques focused on the ability to redirect execution of the embedded processor based on a runtime test of the validity of the subroutine or function about to be executed. Some prior patching methods utilized a validity checking table stored in an ancillary memory device where a flag and target address is associated with each subroutine or function within the embedded firmware. The firmware mechanism to call or invoke such a function or subroutine is adapted to first test an associated entry in the validity table to determine if the validity flag indicates that the subroutine or function is to be redirected to a patched version of the function. If the flag indicates that a function is invalid and the patched version is to be used, the target address associated with the validity table entry is used as an alternate location for the function or subroutine execution. Such a method unfortunately incurs significant execution and memory access overhead in that every function call must include additional program instructions to access and test the validity table entries. Further, additional memory may be required for storage of the validity table.

A related technique utilizes a so-called "double jump" scheme for accessing each function or subroutine in the ROM. A read/write random access memory device (i.e., a RAM or other re-writable memory device) is used to store a jump instruction for each function. As above, program instruction coding styles for such a solution requires that each function be accessed by first jumping to a reserved RAM location. The fixed, reserved RAM location corresponding to the desired function or subroutine would normally contain a second program instruction to jump into the actual desired function or subroutine in the ROM or may contain an address for the function to be performed. In the latter case, the address is read by the processor and then an indirect jump to that location may be performed. Patching firmware in such a structure is a simple matter of replacing the second jump instruction (or address) in the reserved RAM location with the new function (either as a jump instruction to the updated function or an address of the new function to be loaded and jumped to indirectly). As above, such double jump schemes incur additional undesirable execution and memory access overhead.

Prior techniques also include a number of hardware implementations to permit patching of firmware while reducing the potential for undesired execution and/or memory fetch overhead. In general, presently practiced hardware patch mechanisms incur other limitations and overhead. Some presently known hardware patch mechanisms require, in essence, a full mirrored memory component, equal in size to the ROM to be patched, such that each memory location may be fetched from the primary ROM or from the secondary, mirrored memory containing patched versions of functions or other information. Such a full sized, mirrored memory may be wasteful and hence costly where, as is common, the patched portions of firmware may be small by comparison to the size of the complete firmware.

Other presently known hardware approaches include techniques similar to virtual memory paging structures in which hardware components test the validity of each individual memory location or page of memory locations in the primary ROM and redirects requests for invalid locations to the secondary storage components containing patched instructions. Such a structure imposes costs of complexity in the hardware design requirements. Still other hardware approaches provide some form of look-aside or translation buffer to identify functions and subroutines for which an alternate address is to be substituted. Essentially, hardware components monitor jump instructions invoking functions or subroutines and check the look-aside or translation buffer to determine if that function is to be patched with an alternate function. If so, a modified instruction or address is provided in response to the instruction fetch operation.

While such hardware techniques may reduce execution overhead as compared to similar features implemented purely in firmware, they are generally complex and may still impose some execution overhead in that caching operations relating to program instruction fetching may be disrupted. In other words, branch pipeline logic as it is common in many present day microprocessors and microcontrollers attempting to intelligently predict branched paths of execution and thereby optimize instruction caching may be disrupted by a discontinuity in the instruction fetching sequence.

It is evident from the above discussion that a need exists for improved firmware patch structures and methods that are, at once, simple and inexpensive and reduce undesirable execution or memory fetch overhead.

SUMMARY OF THE INVENTION

The present invention solves the above and other problems, thereby advancing the state of the useful arts, by providing methods and structures for patching any arbitrary location in a firmware ROM using a simple, inexpensive structure that imposes no additional execution overhead. In one aspect hereof, a patch memory is associated with the firmware ROM structure. The patch memory may contain a number of addresses and associated data values. Each read operation addressed to the firmware ROM is simultaneously compared with the address values stored in the patch memory. Logic features hereof permit all locations of the patch memory to be compared in parallel so that the comparison may complete within the standard memory cycle presently addressing the ROM memory. If no match is found in the patch memory, the memory read cycle addressed to the ROM firmware may be completed normally and read information is returned through a multiplexer device. If a match is found in patch memory, the multiplexer may be selected to return the optional data value associated with the matched address in the patch memory. The alternate data value so applied may be referred to as a patch value. Any ROM location, including program instructions or data values, may be patched by features and aspects hereof. Features and aspects here of therefore provide for simple, inexpensive patching of ROM based firmware without degrading desired performance goals by additional overhead.

One feature hereof therefore provides a system comprising a program memory for storing program information; a patch memory for storing patch information; a processor coupled to the program memory and coupled to the patch memory; and control logic coupled to the program memory and coupled to the patch memory and coupled to the processor. The control logic is responsive to receipt of a read operation directed from the processor to the program memory and is adapted to selectively substitute a patch value from the patch memory to be returned to the processor in place of a data value from the program memory. The control logic provides the patch value at least as quickly as program memory provides the data value.

Another feature hereof provides a patch memory comprising an address input signal path for receiving a read request address; a data output signal path for receiving an output data value; a plurality of comparison address value elements; a corresponding plurality of patch value elements; comparison logic coupled to the address input signal path and coupled to the plurality of comparison address value elements; and control logic coupled to the plurality of patch value elements and coupled to the comparison logic. The comparison logic is adapted to compare a read address applied to the address input signal path to each of the plurality of comparison address value elements to determine if the read address matches any of the plurality of comparison address value elements. The control logic is responsive to a determination that the read address matches one of the plurality of comparison address value elements to apply a corresponding patch value from a corresponding one of the plurality of patch value elements to the data output signal path.

Another feature hereof provides a method for applying patches to firmware in a read-only program memory comprising the steps of receiving a read operation from a processor directed to a program memory; applying the read operation substantially simultaneously to the program memory to generate a program data value and to a patch memory to generate a patch data value; selecting either the program data value or the patch data value to be returned to the processor in response to the receipt of the read operation; and returning the selected data value to the processor. The selected data value is returned sufficiently quickly avoid degrading processor performance.

Another feature hereof provides a system comprising processor means for reading data and for executing using the read data; and memory means coupled to the processor means for storing program instructions and data to be read by the processor means. The memory means includes program memory means for storing program data; patch memory means for storing patch data; and control means coupled to the program memory means and coupled to the patch memory means. The control means are for selectively substituting patch data from the patch memory means in place of program data from corresponding locations of the program memory means. The control means performs the substitution sufficiently fast to avoid degradation of performance of the processor means.

DETAILED DESCRIPTION OF THE DRAWINGS

Figure 1:
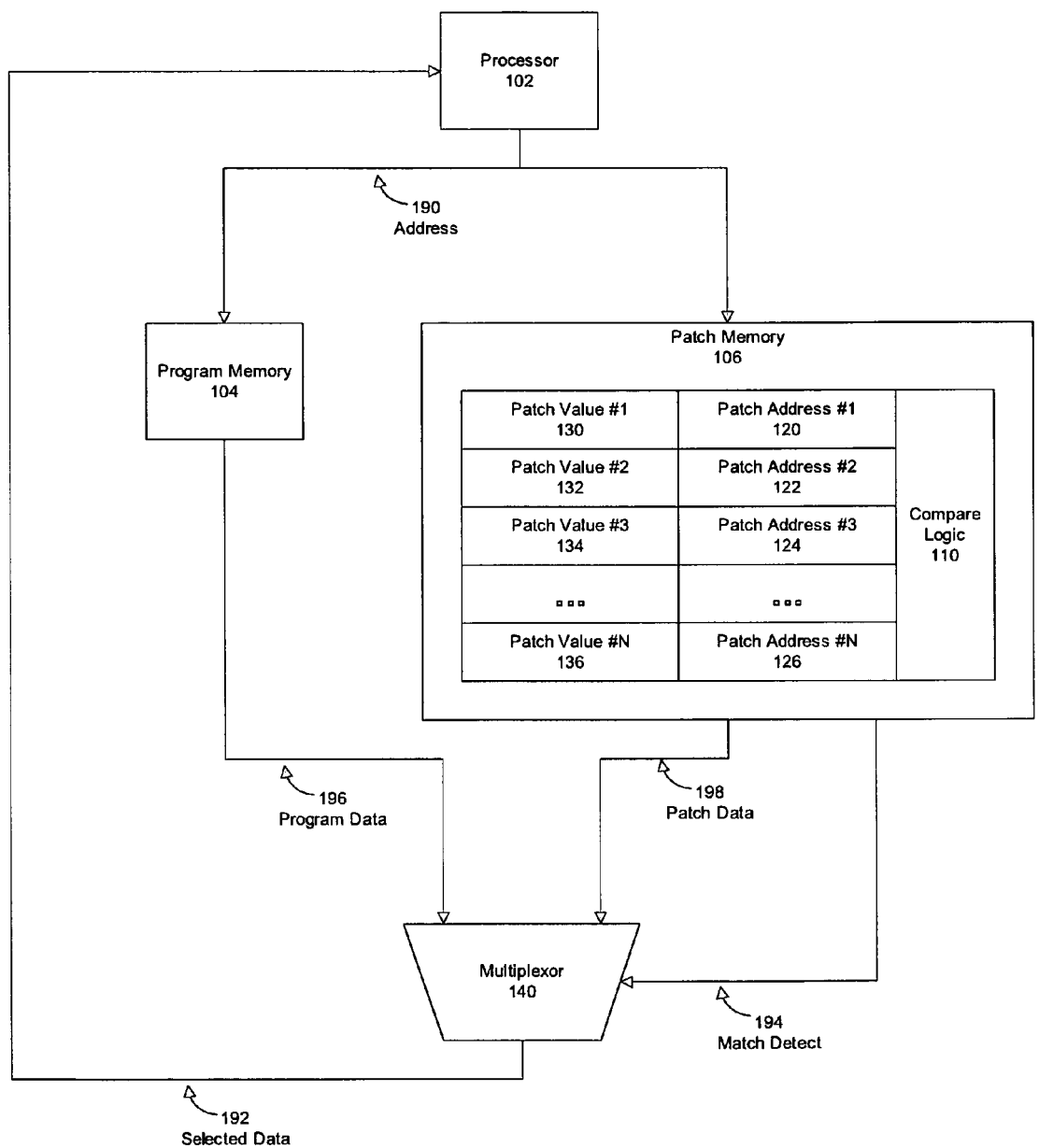
FIG. 1 is a block diagram of a system including features and aspects hereof to provide improved ROM patching.

FIG. 1 is a block diagram of a system 100 providing features and aspects hereof for improved ROM patching capability. System 100 may be any system that includes firmware resident in a ROM. Such systems are common in embedded control systems as noted above such as consumer electronic devices and appliances as well as larger, more complex, commercial applications. System 100 may include processor 102 for executing program instructions in read only memory firmware. Processor 102 may be any form of processing unit that fetches instructions and/or data from an associated memory and executes or operate using the instructions or data so fetched. For example, processor 102 may be a general purpose processor ("CPU") or any of several forms of special purpose processors including, for example, digital signal processors ("DSP"). Therefore, as used herein, "processor" refers to any programmable device that fetches data and/or instructions from an associated memory device and executes or operates on the fetched information. System 100 may include numerous other components (not shown) for providing the desired functionality and I/O interaction with humans or other devices.

In general, processor 102 fetches program instructions by applying an appropriate address to address bus 190 (a "read address") and receives information from the addressed memory location corresponding program instruction or other data on data bus 192. Those of ordinary skill in the art will readily recognize that processor 102 may access other forms of memory (not shown) useful in providing its intended functionality. Further, those skilled in the art will recognize that a memory controller component is often disposed intermediate the processor and the memory to provide dedicated memory management and interfacing features. Particular applications of system 100 may therefore include numerous other devices and memories coupled to the depicted address bus 190 and data bus 192 or to other busses. FIG. 1 is therefore merely intended as a simplified representation of an exemplary structure related to features and aspects hereof rather than a complete system intended for a particular application.

System 100 includes program memory 104 coupled to address bus 190 and program data bus 196. Program memory 104 may be any form of memory component generally providing read only access. For example, program memory 104 may be a standard masked ROM component, a programmable ROM device ("PROM"), various forms of electronically programmable and erasable proms (EPROM and EEPROM) as well as flash memory devices. Program memory 104 may also be a rewritable memory used for storing program instructions and program data and may none-the-less benefit from the features and aspects hereof. Program fixes and changes may be more easily applied through a patch memory feature such as provided herein rather than more complex recompilation, linkage and build procedures that may be required to build a modified program memory. Patch features and aspects hereof are applicable to all such memory components storing program instructions for execution by system 100. As used herein, therefore, "ROM" or "program memory" may be understood to refer to any form of program memory whether masked or programmable, read-only or rewritable, etc.

System 100 also includes patch memory 106. Patch memory 106 provides patch information to be substituted for data normally read/fetched from program memory 104 in response to read/fetch operations by processor 102. Patch memory 106 receives the memory read address from address bus 190 in parallel with program memory 104. If patch memory 106 identifies a matching address corresponding to the applied read address on bus 190, alternative or patch data is applied to bus 198 and a signal is applied to match detect 194 to so indicate the detected address match. The match detect 194 signal is applied as a select input to multiplexer 140 to select patch data on bus 198 for application to data bus 192. If patch memory 106 does not detect a match for the read address applied to bus 190, match detect 194 is applied to multiplexer 140 to select standard program data from bus 196 for application to data bus 192. Patch memory 106 therefore substitutes values in place of actual read data in response to a read access to program memory 104 by processor 102.

Patch memory 106 detects address matches and substitutes patch data, if appropriate, within the timing constraints of normal read cycle timing of program memory 104. Patching features and aspects hereof therefore do not impose any execution overhead as compared to prior techniques. Further, since patch memory 106 may substantially overlap its operation with that of program memory 104 without further access to the memory address and data buses, no additional memory bandwidth is utilized by features and aspects hereof as compared with prior techniques.

Patch memory 106 may be implemented as a content addressable memory ("CAM"—also sometimes referred to as "associative memory"). Features of a CAM may be equivalently implemented as custom designed logic as generally known in the art. As used herein, CAM (or content addressable memory) means commercially available memory devices (whether referred to as content addressable or as associative) as well as custom designed application specific integrated circuits adapted to provide similar content addressing features.

In general, a content addressable memory provides multiple pairs of storage locations. Each pair includes a comparison value and a data value. The comparison value is compared to an applied input value and, if a match is detected by the content addressable memory, the associated data value is applied as the output of the content addressable memory. The comparison between an applied input value and each of the multiple comparison values may be performed substantially in parallel within the structure of a content addressable memory or may be performed sequentially or serially if the timing constraints noted above are met. To perform all comparisons in parallel, a CAM would typically include multiple comparators, one associated with each corresponding pair of storage locations. If comparisons are performed sequentially, the CAM may include a single comparator and logic to sequence through each of the pairs of storage locations to compare the applied input value to the comparison value of each pair of storage locations. Whether performed in parallel or serially, the comparisons performed within a content addressable memory and the associated application of corresponding alternate or patch data values to the output of the content addressable memory are completed in memory cycle times substantially equivalent to memory cycle times of program memory 104.

As depicted in FIG. 1, a content addressable memory such as patch memory 106 may include a plurality of patch address values 120 through 126 and corresponding patch data values 130 through 136. Compare and control logic 110 within patch memory 106 may receive an address value (read address) applied to patch memory 106 via address bus 190. The read address may be applied simultaneously to program memory 104 and to patch memory 106 by processor 102 over address bus 190. The received read address value is then compared with each patch address value 120 through 126. As noted above, multiple comparisons may be performed in parallel or sequentially so long as the comparisons are completed quickly enough to substantially match the memory cycle time of program memory 104. If compare and control logic 110 detects a match between the applied address value on bus 190 and one of the comparison patch address values 120 through 126, an appropriate selection signal is applied to match detect 194 for application as a select signal to multiplexer 140. The selection signal applied to multiplexer 140 when an address match is detected by logic 110 indicates that a data value applied to data bus 198 should be selected as the input of multiplexer 140. The patch data value corresponding to the matched address is then applied to patch data bus 198. For example, if a read address on address bus 190 matches patch address #2 (122) as determined by compare and control logic 110, patch value #2 (132) is applied to patch data bus 198 for application as an input to multiplexer 140.

If compare and control logic 110 determines that none of patch addresses 120 through 126 match the read address applied to address bus 190, an appropriate signal is applied to match detect 194 to indicate that no match was detected in patch memory 106. This selection signal causes multiplexer 140 to select the program data value on bus 196 as its selected input.

Multiplexer 140 therefore selects either patch data bus 198 or program data bus 196 as an input signal to be applied to selected data bus 192 for return to processor 102. Multiplexer 140 selects between the two inputs based upon the signal applied to match detect 194 by compare logic 110 of patch memory 106.

Patch memory 106 therefore permits simple, inexpensive patching of program memory 104 without imposing execution or memory bandwidth overhead on system 100. In addition, further logic, (not shown), may apply a default patch value as a patch data value on patch data bus 198 when a match is detected by compare logic 110.

Those of ordinary skill in the art will readily recognize other equivalent structures for implementation of patch memory 106 and for multiplexed selection of data values produced either by program memory 104 or patch memory 106.

Figure 2:
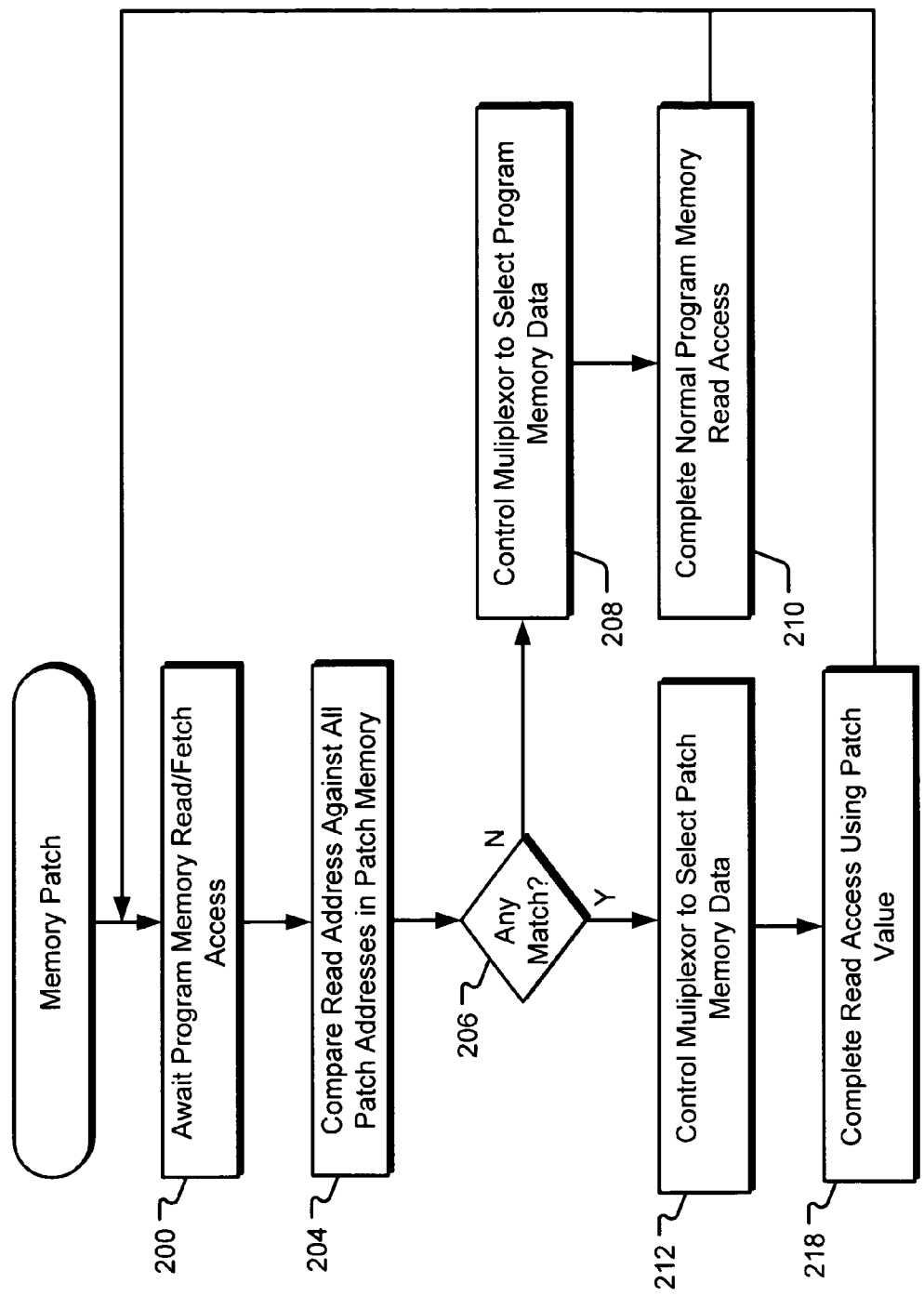
FIG. 2 is a flowchart describing operation of features and aspects hereof for performing improved ROM patching

FIG. 2 is a flow chart describing an exemplary method of operating patch features and aspects hereof. Element 200 is first operable to await a program memory read/fetch access initiated by an associated processor. Element 204 then compares the read address supplied in the program memory read access to all comparison patch address values stored in the patch memory. As noted above, a content addressable memory compares the applied input value to each of multiple comparison values. Typically the comparisons are performed substantially in parallel. Alternatively, comparisons may be performed sequentially so long as comparisons are completed fast enough to essentially match the memory cycle time of the program memory being patched thus avoiding undesirable performance degradation. Element 206 then determines whether the comparisons resulted in any successful match within the patch memory. If not, element 208 controls a multiplexer to apply data returned from program memory to the requesting processor. Element 210 then returns the program data retrieved from the program memory to the requesting processor and processing continues by looping back to element 200 to await a next program memory read operation.

If element 206 determines that the comparisons of element 204 detected a match between the applied read address and one of the multiple comparison patch address values within patch memory, element 212 is operable to control the multiplexer for selection of the patch data value generated by the content addressable memory. Element 218 is operable to complete the read operation by returning the optional patch value associated with the matched patch address.

Those of ordinary skill in the art will readily recognize numerous equivalent processes to provide the desired program memory patching features and aspects hereof. FIG. 2 is therefore intended as merely exemplary of one of several equivalent processes to provide the patching features and aspects hereof.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method comprising:

receiving at a program memory and a patch memory a request address from a requester;

generating a program data value from the program memory based on the request address;

returning to the requester, in place of the program data value, a patch data value recorded in association with the request address in the patch memory, if the request address is matched in the patch memory, the patch data value being returned to the requester in no more time than the program data value would have been returned to the requester if the request address was not matched in the patch memory.

2. The method of claim 1 further comprising:

generating the patch memory data value from the patch memory, if the request address matches a patch address recorded in the patch memory.

3. The method of claim 1 further comprising:

returning the program memory data value from the program memory to the requester, if the request address matches a program address of the program memory and the request address does not match a patch address recorded in the patch memory.

4. The method of claim 1 further comprising:

comparing the request address with each patch address recorded in the patch memory.

\* \* \* \* \*

UNITED STATES PATENT AND TRADEMARK OFFICE
CERTIFICATE OF CORRECTION

PATENT NO. : 7,596,721 B1 Page 1 of 1
APPLICATION NO. : 10/755117
DATED : September 29, 2009
INVENTOR(S) : Flake et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1286 days.

Signed and Sealed this

Twenty-eighth Day of September, 2010

David J. Kappos
*Director of the United States Patent and Trademark Office*